UNITED STATES PATENT OFFICE.

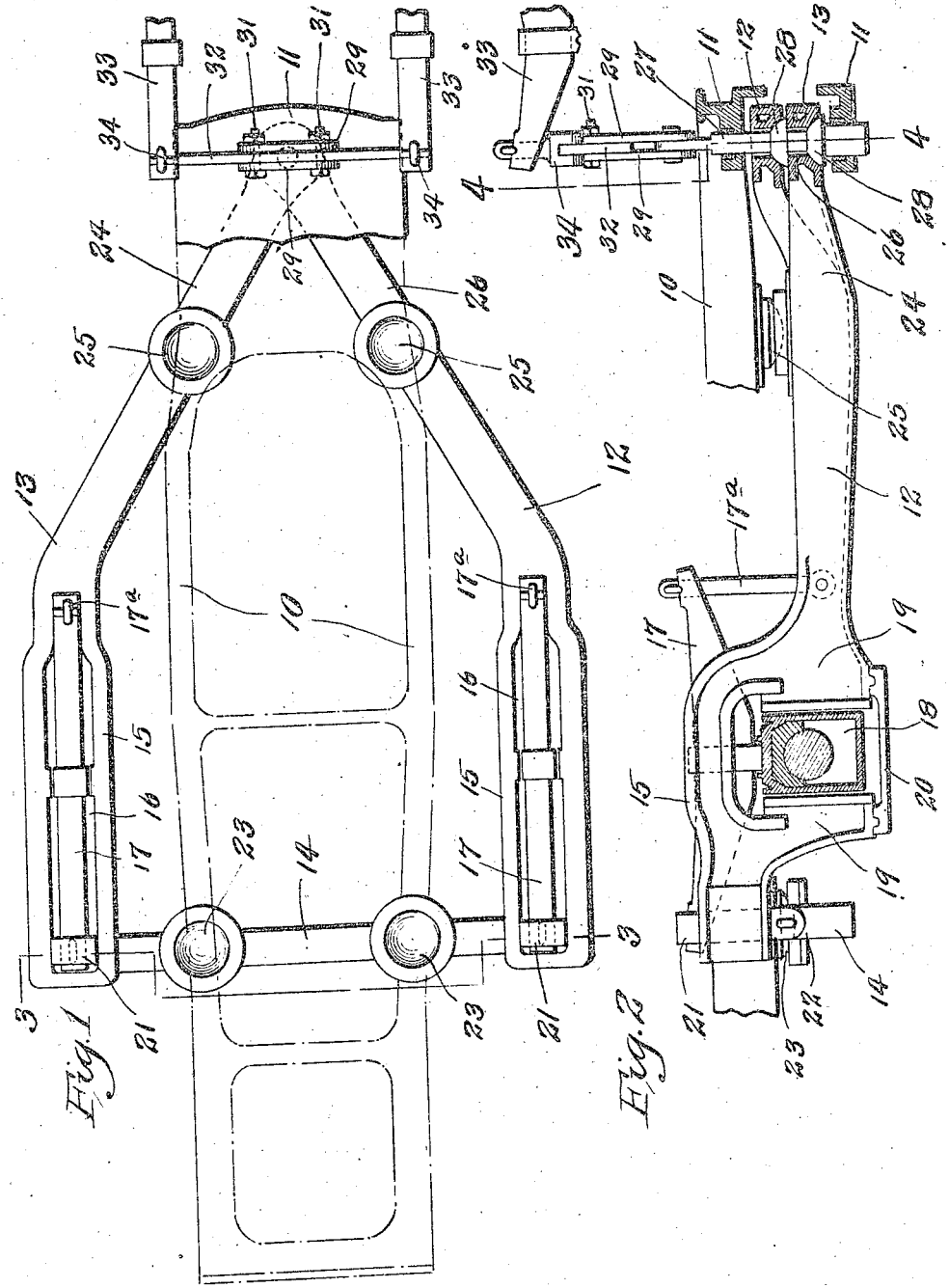

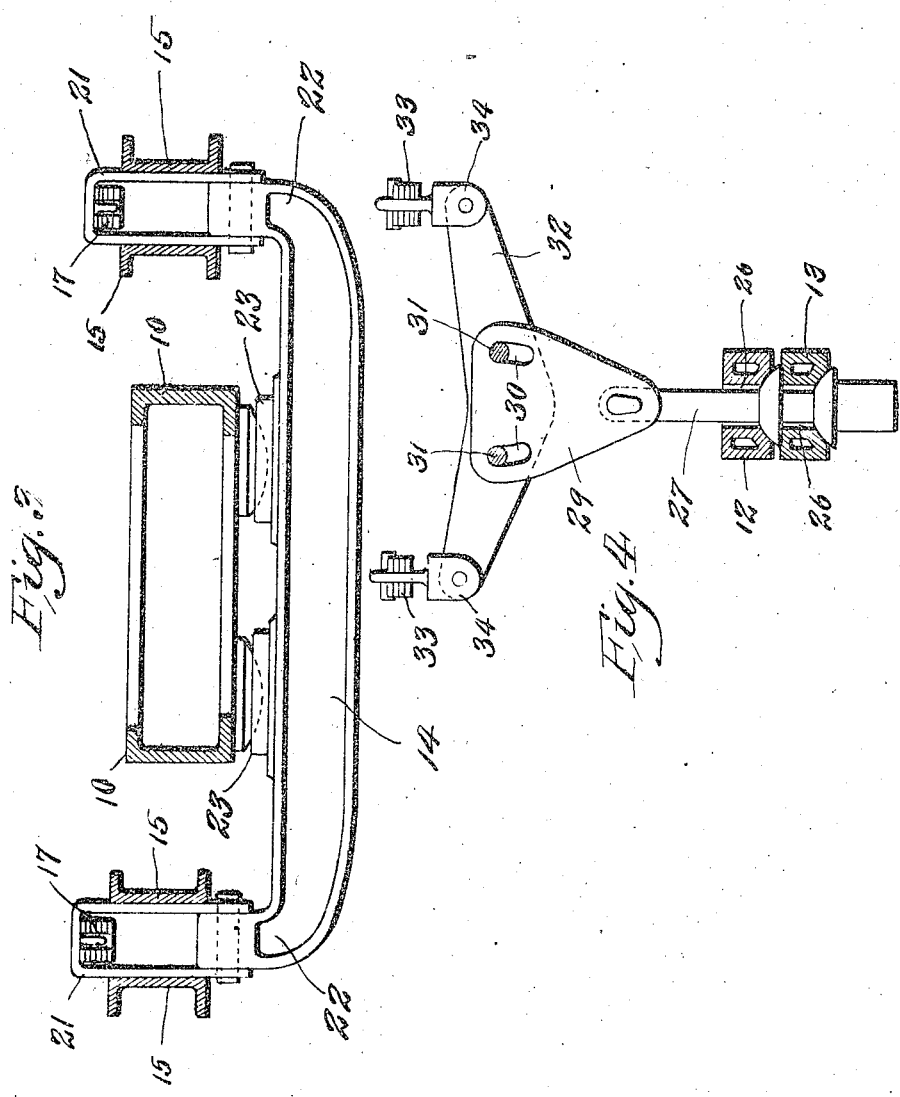

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

TRAILER-TRUCK FOR LOCOMOTIVES.

1,275,341.   Specification of Letters Patent.   Patented Aug. 13, 1918.

Application filed January 15, 1918. Serial No. 211,940.

*To all whom it may concern:*

Be it known that I, CHARLES T. WESTLAKE, a citizen of the United States, residing at St. Louis, Missouri, have invented a certain new and useful Improvement in Trailer-Trucks for Locomotives, of which the following is a full, clear, and exact description, such as will enable others skilled in the art to which it appertains to make and use the same, reference being had to the accompanying drawings, forming part of this specification.

My invention relates generally to trailer trucks for locomotives, and more particularly to the types of trailer trucks disclosed in Patents Nos. 1,099,376, dated June 9, 1914, and 1,210,124, dated December 26, 1916, the principal object of my present invention being to generally improve upon and simplify the constructions disclosed in said patents and other existing types of trailer trucks, and to provide a truck frame which is articulated in construction, thereby materially increasing the flexibility of the truck.

Further objects of my invention are, to provide a trailer truck having side rails which, under certain conditions, perform the functions of equalizers and act independently of each other in performing such functions, and further, to provide improved means for supporting and connecting the forward end of the trailer truck frame to the locomotive frame and parts associated therewith.

With the foregoing and other objects in view, my invention consists in certain novel features of construction and arrangement of parts, hereinafter more fully described and claimed, and illustrated in the accompanying drawings, in which—

Figure 1 is a top plan view of a trailer truck of my improved construction, the same being associated with a part of the locomotive frame.

Fig. 2 is a side elevational view of the trailer truck frame.

Fig. 3 is an enlarged cross section taken approximately on the line 3—3 of Fig. 1.

Fig. 4 is an enlarged vertical section taken approximately on the line 4—4 of Fig. 2.

Referring by numerals to the accompanying drawings which illustrate a practical embodiment of my invention, 10 designates the side rails or members of the locomotive frame or cradle, and formed integral with or rigidly fixed thereto is a substantially hollow front end member 11 which serves as a bearing or support for the pin or radius bar fulcrum which pivotally connects the front end of the trailer truck frame to the locomotive frame.

The trailer truck frame contemplated by my invention comprises a pair of separately formed side frames 12 and 13 and a rear end frame or cross member 14. Each side frame includes a rear portion 15 which is slotted lengthwise as designated by 16 in order to accommodate a comparatively heavy leaf spring 17, the central portion of which latter bears directly on top of the trailer truck axle journal box 18.

Each journal box is arranged for vertical movement between a pair of pedestals 19, the same being formed integral with and depending from the rear portions 15 of the side frames and the lower portions of these pedestals are connected below the journal boxes 18 in any suitable manner, preferably by means of tie plates 20. The forward ends of the springs 17 are connected to the side frames 12 and 13 immediately in front of the pedestals by vertically disposed hangers 17$^a$.

Bearing directly on top of the rear ends of the springs 17 and arranged to slide vertically in the rear portions of the openings 16 are spring shackles 21, substantially of inverted U-shape and pivotally connected to the lower ends of said shackles in any suitable manner are the upturned ends 22 of the rear cross member 14 of the trailer truck. This rear end member may be flanged, hollow or of any suitable cross sectional shape.

The rear portion of the locomotive frame or cradle 10 is supported by the rear cross member 14, there being suitable friction pads 23 interposed between the top of said cross member and the side rails of the locomotive frame.

The forward portion 24 of each side frame is inclined with respect to the plane occupied by the rear portion 15 and said forward portions extend beneath the side rails of the locomotive frame 10, the latter being supported on the side frames by means of suitable friction pads 25. These inclined front portions 24 are flanged, hollow or of any suitable cross sectional shape and the extreme forward end of side frame 13 is extended upwardly so that it occupies a position immediately above the extreme front end of side frame 12. The forward ends of both side frames are provided with vertically alined apertures 26 which accommodate a vertically disposed pin 27 or radius bar fulcrum. This pin bears in the housing or frame 11 which is a part of the locomotive frame 10 and arranged on said pin are semi-spherical collars 28 which rest or bear in corresponding recesses formed in the undersides of the front ends of the side frames. (See Fig. 2).

The upper end of the radius bar 27 is pivotally connected to the lower ends of a pair of substantially triangular plates 29, the latter being provided near their upper portions with slots 30 suitably spaced apart and which receive pins 31, the latter being seated in the rear cross equalizer 32. The ends of this equalizer 32 are supported from the rear ends of the rear driver springs 33 by links or shackles 34.

In my improved construction of trailer truck it will be noted that the three main parts of the truck frame, namely, the side members and the rear cross member, are separately formed, and can move independently of each other. Further, that the locomotive frame or cradle is supported at four points on said frame and that the forward end of the latter is flexibly connected to the locomotive frame and to the rear driver springs.

When in service, the parts of the truck frame can move independently of each other, thereby producing great flexibility and entirely eliminating torsional strains which would result in the event that the frame were formed in one piece or in parts rigidly fixed to each other. The side frames 12 and 13 of the truck frame under certain conditions, perform the functions of equalizers and when such action occurs, said frames act entirely independent of each other by virtue of the flexible connections between the ends of the side frame and the radius bar fulcrum and the rear cross member.

The friction pads 23 and 25 are effective in maintaining the trailer truck in any position in which it may be placed. For illustration:—If the locomotive is running on a straight track, considerable force will be required to overcome the resistance of these friction pads before the truck can swing laterally in one direction or the other, and this resistance tends to steady the locomotive against any tendency to move due to the alternate action of the pistons. This effect is also true when the locomotive is entering a curve or tangent, for considerable force will be required to move the truck and by virtue of the friction pads, the lateral movement is gradual, rather than sudden. Thus the yielding resistance due to friction in said pads controls the lateral swinging movement of the truck.

In some instances it may be desirable to utilize a gravity actuated truck centering device, instead of friction pads, and such device would not only serve to lend stability to the truck during its lateral movement, but would also serve to bring it back to central position and so maintain it while running on straight track.

By utilizing a three-point hanger at the forward end of the trailer truck frame, the latter is permitted to move freely in all directions independent of its support. By connecting the hanger plates at two spaced points on the rear equalizer, the latter cannot tilt without changing the loading of the two bearing points and changing the loading of the springs, and together, they form a stabilizer for the spring rigging and the locomotive which tends to restore the parts to their normal position when any external force is applied that tends to displace them.

A trailer truck frame of my improved construction is comparatively simple, has great flexibility, and can be readily assembled or taken apart, thus greatly facilitating repairs or renewal of parts.

It will be readily understood that minor changes in the size, form and construction of the various parts of my improved trailer truck frame can be made and substituted for those herein shown and described, without departing from the spirit of my invention, the scope of which is set forth in the appended claims.

I claim:

1. A locomotive trailer truck having a pair of flexibly connected side frames, and a rear end frame flexibly connected to said side frames.

2. A locomotive trailer truck having a pair of flexibly connected side frames, a rear end frame flexibly connected to said side frames, and bearings on said frames for the locomotive frame.

3. In a locomotive trailer truck, a pair of separately formed and independently acting side frames, and a rear end frame connected to the rear portions of said side frames.

4. In a locomotive trailer truck, a pair of separately formed and independently acting side frames, and a rear end frame flexibly connected to the rear portions of said side frames.

5. In a locomotive trailer truck, an articulated frame comprising separately formed and independently acting side members, and a rear end frame.

6. A trailer truck frame comprising a pair of separately formed side frames, the forward ends of which are flexibly connected, a rear end frame flexibly connected to said side frames, and said side frames being provided with pedestal jaws.

7. A trailer truck frame comprising a pair of separately formed side frames, the forward ends of which are flexibly connected, a rear end frame flexibly connected to said side frames, and said side frames being provided with pedestal jaws adapted to receive journal boxes and with openings above said pedestal jaws adapted to receive springs which rest upon the journal boxes.

8. In a locomotive trailer truck, a pair of side members, flexibly connected at their forward ends and provided with openings adapted to receive journal boxes, springs mounted on said journal boxes, a cross member disposed between the rear portions of said side members, and connections between the ends of said cross member and the rear portions of said springs.

9. In a locomotive trailer truck, a pair of side members, flexibly connected at their forward ends and provided with openings adapted to receive journal boxes, springs mounted on said journal boxes, a cross member disposed between the rear portions of said side members, connections between the ends of said cross member and the rear portions of said springs, and connections between the forward ends of said springs and the side members.

10. A locomotive trailer truck frame having separately formed side members, the rear portions of which are spaced apart and the forward portions of which converge to a common point, and said members being flexibly connected front and rear.

11. In a locomotive trailer truck, a pair of separately formed flexibly connected truck side frames, and a radius bar fulcrum to which the forward ends of said side frames are flexibly connected.

12. In a locomotive trailer truck, a pair of separately formed truck side frames, a radius bar fulcrum to which the forward ends of said side frames are flexibly connected, and a cross frame disposed between and flexibly connected to the rear portions of said side frames.

13. In a locomotive trailer truck, a pair of separately formed truck side frames, a radius bar fulcrum to which the forward ends of said side frames are flexibly connected, and flexible connections between the radius bar fulcrum and the rear driver springs of the locomotive.

14. In a locomotive trailer truck, a pair of separately formed truck side frames, a radius bar fulcrum to which the forward ends of said side frames are flexibly connected, and flexible connections between the radius bar fulcrum and the rear driver springs of the locomotive, which flexible connections include a pair of links and an equalizer bar.

15. The combination with a trailer truck frame, of a radius bar fulcrum to which the forward end of the truck frame is pivotally connected, an equalizer supported by the rear driver springs of the locomotive, and a member connected to the radius bar fulcrum and having two points of pivotal connection with said equalizer.

16. The combination with a trailer truck frame having separately formed flexibly connected side members, of a radius bar fulcrum to which the forward ends of the side members of the frame are flexibly connected, and flexible connections including an equalizer between said radius bar fulcrum and the rear driver springs of the locomotive.

17. The combination with a trailer truck frame, of a single front suspension, an equalizer supported by the rear driving springs of the locomotive, and there being spaced fulcrums between said front suspension and said equalizer.

18. The combination with a trailer truck frame, of a single front suspension, and an equalizer supported by the rear driver springs of the locomotive, said front suspension having two bearings on said equalizer.

19. The combination with a locomotive main frame, of a trailer truck having side frames and a rear end frame flexibly connected to said side frames, and having movable contact with the main frame.

20. The combination with a locomotive main frame, of a trailer truck having side frames, a rear end frame flexibly connected to the side frames, and a trailer truck movement controller interposed between said trailer truck and the main frame.

21. The combination with a locomotive main frame, of a trailer truck having side frames, a rear end frame flexibly connected to the side frames, and means interposed between the trailer truck and the main frame for controlling the lateral swinging movement of said trailer truck frame.

In testimony whereof I hereunto affix my signature this 26th day of December, 1917.

CHARLES T. WESTLAKE.